United States Patent
Ravelli et al.

(10) Patent No.: US 12,297,641 B2
(45) Date of Patent: *May 13, 2025

(54) CAST STONE CORNER HARDSCAPING BLOCK

(71) Applicant: Cast Stonescapes, LLC, Santa Barbara, CA (US)

(72) Inventors: John E. Ravelli, Dorothy, NJ (US); Eric Y. Long, Sewell, NJ (US); John M. Poignard, Ashville, NY (US)

(73) Assignee: Cast Stonescapes, LLC, Santa Barbara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/417,942

(22) Filed: Jan. 19, 2024

(65) Prior Publication Data

US 2024/0159048 A1 May 16, 2024

Related U.S. Application Data

(60) Continuation of application No. 17/130,013, filed on Dec. 22, 2020, now Pat. No. 11,879,248, which is a
(Continued)

(51) Int. Cl.
*E04B 2/02* (2006.01)
*B29C 39/12* (2006.01)
(Continued)

(52) U.S. Cl.
CPC .............. *E04B 2/02* (2013.01); *B29C 39/123* (2013.01); *E02D 29/025* (2013.01); *E04C 1/395* (2013.01);
(Continued)

(58) Field of Classification Search
CPC .............. E04B 2/02; E04B 2002/0202; E04B 2002/0204; E04B 2002/0206;
(Continued)

(56) References Cited

U.S. PATENT DOCUMENTS 1,411,005 A 3/1922 Dula et al.
2,002,311 A 5/1935 Stanley et al.
(Continued)

FOREIGN PATENT DOCUMENTS

CA 2159941 A1 4/1996
CA 147346 A 9/2013
(Continued)

OTHER PUBLICATIONS

Arxell Drying Systems, How Quickly Should Concrete Be Dried, Sep. 7, 2016, www.arxell.com, pp. 1-2. (Year: 2016) Cited in related U.S. Appl. No. 15/861,227].
(Continued)

*Primary Examiner* — Jessie T Fonseca
(74) *Attorney, Agent, or Firm* — Steven J. Rocci P.C.

(57) ABSTRACT

A hardscaping block includes a dry cast concrete backer block having angularly arranged contact surfaces and an integrated wet cast concrete veneer block chemically bonded to the contact surfaces, the veneer block having an exteriorly facing simulated stone surface. The integrated backer block and veneer block form a cast stone corner hardscaping block.

14 Claims, 8 Drawing Sheets

Related U.S. Application Data division of application No. 15/861,227, filed on Jan. 3, 2018, now Pat. No. 10,883,267.

(60) Provisional application No. 62/450,294, filed on Jan. 25, 2017.

(51) Int. Cl.
  *E02D 29/02* (2006.01)
  *E04C 1/39* (2006.01)
  *E04C 1/40* (2006.01)

(52) U.S. Cl.
  CPC ........ *E04C 1/40* (2013.01); *E04B 2002/0267* (2013.01); *E04B 2002/0269* (2013.01)

(58) Field of Classification Search
  CPC ..... E04B 2002/0226; E04B 2002/0284; E04B 2002/0269; E04B 2002/0267; E04C 1/40; E04C 1/41; E04C 1/395; E04C 2/041; B28B 7/007; B28B 7/183; B28B 19/0015; B29C 39/10; B29C 39/12; B29C 39/123; E02D 29/025
  See application file for complete search history.

(56) References Cited

U.S. PATENT DOCUMENTS

| | | |
|---|---|---|
| 2,238,787 A | 4/1941 | Aberson et al. |
| 2,482,556 A | 9/1949 | Petras et al. |
| 2,648,974 A | 8/1953 | Sommers et al. |
| 3,290,849 A | 12/1966 | Wright et al. |
| 3,621,086 A | 11/1971 | Guide et al. |
| 3,660,214 A | 5/1972 | Nichols et al. |
| 3,809,595 A | 5/1974 | Nichols et al. |
| 4,185,431 A | 1/1980 | Brownlee |
| 4,196,161 A | 4/1980 | Toffolon et al. |
| 4,590,726 A | 5/1986 | Salazar |
| 4,702,877 A | 10/1987 | Davis, Jr. |
| 5,062,610 A | 11/1991 | Woolford et al. |
| 5,457,926 A | 10/1995 | Jensen |
| 5,465,544 A | 11/1995 | Ghahary |
| 5,756,029 A | 5/1998 | Nakamichi et al. |
| 5,788,423 A | 8/1998 | Perkins |
| 5,878,545 A | 3/1999 | Gebhart |
| 5,930,964 A | 8/1999 | Boehning |
| 6,000,183 A | 12/1999 | Newman |
| 6,062,772 A | 5/2000 | Perkins |
| D466,619 S | 12/2002 | Britton |
| D467,009 S | 12/2002 | Agee |
| D468,449 S | 1/2003 | Britton |
| 6,758,020 B2 | 7/2004 | Cerrato |
| D530,831 S | 10/2006 | Mugge et al. |
| 7,175,414 B2 | 2/2007 | Ness et al. |
| D551,358 S | 9/2007 | Deragon |
| D584,423 S | 1/2009 | Mugge |
| 7,490,444 B2 | 2/2009 | Nowack |
| 7,637,737 B2 | 12/2009 | Furner et al. |
| D611,164 S | 3/2010 | Mugge |
| D639,455 S | 6/2011 | Mugge et al. |
| 7,976,963 B2 | 7/2011 | Olson, III et al. |
| D644,744 S | 9/2011 | Mugge et al. |
| D644,745 S | 9/2011 | Meadows |
| D644,746 S | 9/2011 | Meadows |
| D644,747 S | 9/2011 | Meadows |
| D644,748 S | 9/2011 | Meadows |
| D644,749 S | 9/2011 | Meadows |
| D645,165 S | 9/2011 | Wolter et al. |
| D646,402 S | 10/2011 | Mugge |
| 8,061,095 B2 | 11/2011 | Bucheger |
| D674,512 S | 1/2013 | Manthei |
| D679,029 S | 3/2013 | Mugge et al. |
| D685,923 S | 7/2013 | Mugge et al. |
| D690,837 S | 10/2013 | Mugge et al. |
| 8,562,260 B2 | 10/2013 | Matys et al. |
| D696,425 S | 12/2013 | Mugge et al. |
| D698,942 S | 2/2014 | Mugge et al. |
| D699,866 S | 2/2014 | Mugge et al. |
| D703,346 S | 4/2014 | Johnson et al. |
| 8,914,950 B1 | 12/2014 | Engerdahl |
| 2001/0023559 A1 | 9/2001 | Ozawa et al. |
| 2002/0030303 A1 | 3/2002 | Manthei et al. |
| 2002/0152709 A1 | 10/2002 | Gresser et al. |
| 2005/0258572 A1 | 11/2005 | Messenger et al. |
| 2006/0101756 A1 | 5/2006 | McClure |
| 2006/0273492 A1 | 12/2006 | Johnson |
| 2007/0094991 A1 | 5/2007 | Price et al. |
| 2008/0277561 A1 | 11/2008 | MacDonald |
| 2010/0018146 A1 | 1/2010 | Aube et al. |
| 2010/0192502 A1 | 8/2010 | Mugge et al. |
| 2011/0203211 A1 | 8/2011 | Metten |
| 2011/0217127 A1 | 9/2011 | MacDonald |
| 2012/0256351 A1 | 10/2012 | Chen |
| 2014/0199553 A1 | 7/2014 | Sadler |
| 2014/0373479 A1 | 12/2014 | Karau |
| 2015/0071715 A1 | 3/2015 | Hammer et al. |
| 2018/0257271 A1 | 9/2018 | Karau |
| 2018/0274229 A1 | 9/2018 | Burnquist et al. |

FOREIGN PATENT DOCUMENTS

| | | |
|---|---|---|
| DE | 19915589 A1 | 5/2000 |
| FR | 2499615 A1 | 8/1982 |
| FR | 3002777 A1 | 9/2014 |
| JP | 2002097773 A | 4/2002 |
| KR | 100969308 B1 | 7/2010 |
| WO | 2012059757 A2 | 5/2012 |

OTHER PUBLICATIONS

Radonseal, How Porosity Destroys Concrete and Basements, Mar. 28, 2014, http://web.archive.org/web/20140328151029/https://www.radonseal.com/artic-les/concrete-porosity-basements.htm. (Year: 2014) [Cited in elated U.S. Appl. No. 15/861,227].

Canadian Patent Application No. 161595: Examiner's Report dated Jan. 26, 2016, 1 page [Cited in related U.S. Appl. No. 15/861,227].

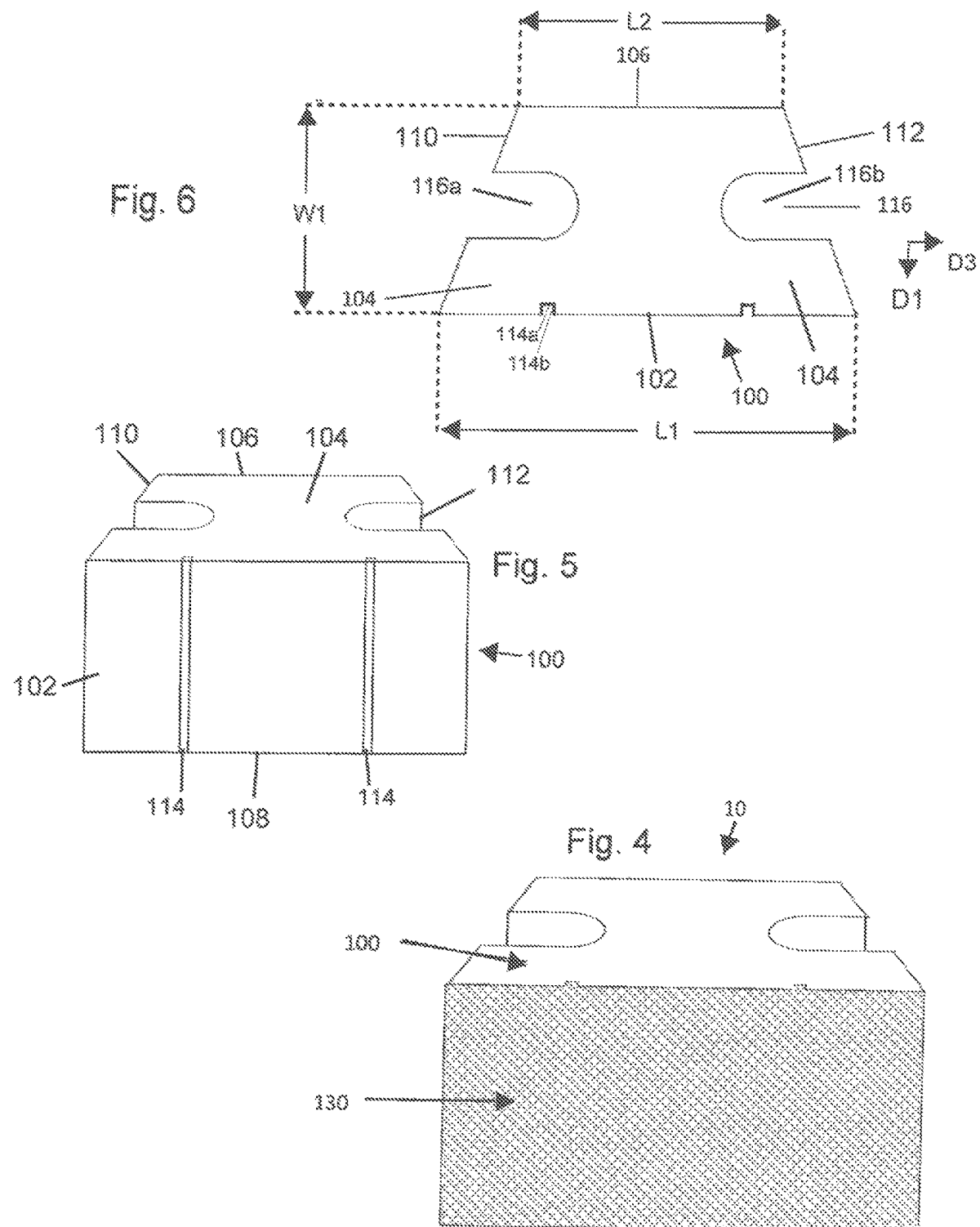

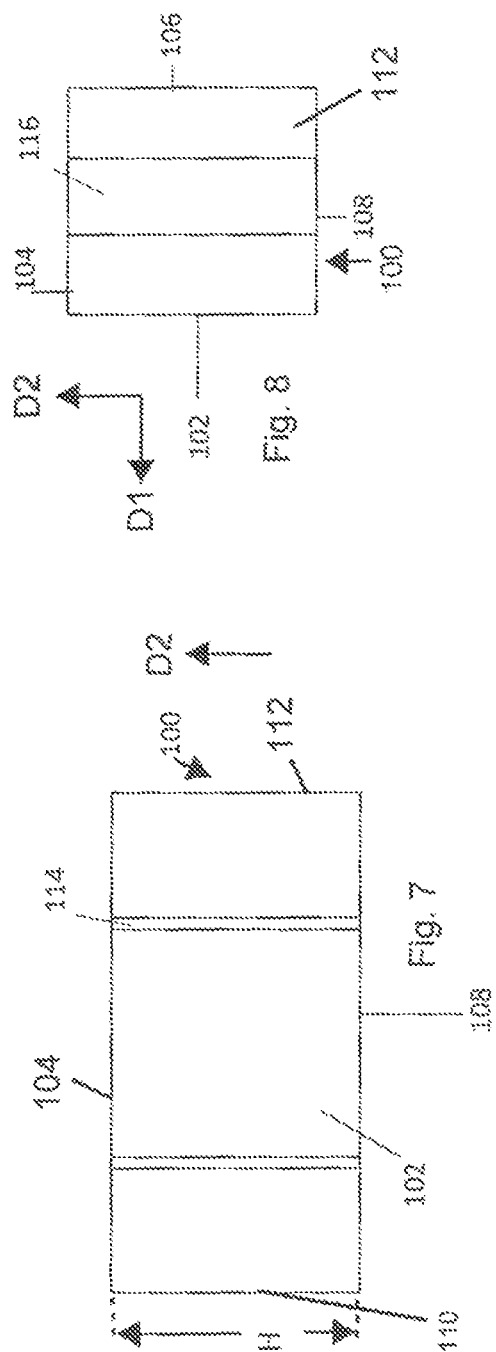

CAST STONE CORNER HARDSCAPING BLOCK

CROSS REFERENCE TO RELATED APPLICATIONS

This application is a continuation of and claims the benefit of commonly assigned U.S. patent application Ser. No. 17/130,013 filed Dec. 22, 2020, now U.S. Pat. No. 11,879,248, which is a division of U.S. patent application Ser. No. 15/861,227 filed Jan. 3, 2018, now U.S. Pat. No. 10,883,267, which claims priority to U.S. Provisional Patent Application No. 62/450,294 filed Jan. 25, 2017. The disclosures of each of the forgoing are herein incorporated by reference in their entireties. The subject matter claimed in this application is also related to that claimed in commonly assigned U.S. Pat. No. 11,802,406.

TECHNICAL FIELD

This disclosure relates generally to the field of hardscaping and to masonry blocks which may be used in the construction of hardscaping or landscaping elements. More specifically, the present disclosure relates to hardscaping unit manufacturing processes and the resulting hardscaping units that may be used to construct hardscape or landscape structures.

BACKGROUND

Hardscaping structures are useful in many hardscaping or landscaping endeavors, such as decoration, soil retention, protection of natural and artificial structures, bases for other construction, and other related projects. For example, homeowners may desire a structure that resembles natural rock surface. However, natural rock is often difficult to work with, hard to combine with other pieces, and expensive to transport. Naturally-occurring pieces usually need to be treated or manipulated to fit the desired size, shape, and texture that the user wants. Additionally, homeowners want such investments to be long-lasting and require little or no maintenance. Such options are often very heavy, expensive to maintain, and prone to damage.

Previously, manufactured blocks were used to build hardscaping and landscaping walls. Some of these blocks had different structural or aesthetic features, and they could be combined to construct walls or barriers. However, many of them do not offer a "natural" stone look that many customers desire. Additionally, they are often difficult to stack on top of each other or combine with other units. Furthermore, the aesthetic portions are often fragile and get damaged during transportation, installation, or early in their use. It is desired to manufacture hardscaping units that are long-lasting, easy to manufacture, and can replace natural rock while maintaining a natural appearance.

SUMMARY

According to an aspect of the disclosure, a method of assembling a hardscaping unit includes the steps of placing a first material into a first mold, and while the first material is in the first mold, transitioning the first material from a first state to a second state, wherein the second state is more solid than the first state, and when in the second state the first material forms a first block. The method further includes the steps of removing the first block from the first mold, placing a second material into a second mold, contacting at least one surface of the first block with the second material while the second material is in the second mold, after the contacting step, maintaining contact of the at least one surface of the first block with the second material while transitioning the second material from a third state to a fourth state, wherein the fourth state is more solid than the third state, and when in the fourth state the second material forms a second block that is secured relative to the first block, and after the maintaining step, removing the second block from the second mold.

According to an aspect of the disclosure, a hardscaping unit includes a first block including a front surface and a back surface, the front surface spaced from the back surface in a direction. The first block defines a first portion that includes the back surface. The hardscaping unit includes a second block including a contact surface in contact with the front surface of the first block such that the first block and the second block are fixedly attached to one another to form a combined block. The second block defines a second portion, the first block includes a first material, the second block includes a second material, the first portion includes the first material and is devoid of the second material, the second portion includes the second material and is devoid of the first material, and the combined block defines a third portion that includes both the first material and the second material, and the third portion is positioned between the first portion and the second portion with respect to the direction.

BRIEF DESCRIPTION OF THE DRAWINGS

The foregoing summary, as well as the following detailed description of illustrative embodiments of the cover of the present application, will be better understood when read in conjunction with the appended drawings. For the purposes of illustrating the cover of the present application, there is shown in the drawings illustrative embodiments. It should be understood, however, that the application is not limited to the precise arrangements and instrumentalities shown. In the drawings:

FIG. 4 is an isometric view of one of the plurality of hardscaping units illustrated in FIG. 1;

FIG. 5 is an isometric view of a first block of the hardscaping unit illustrated in FIG. 4;

FIG. 6 is a top plan view of the first block illustrated in FIG. 5;

FIG. 7 is a front elevation view of the first block illustrated in FIG. 5;

FIG. 8 is a side elevation view of the first block illustrated in FIG. 5;

DETAILED DESCRIPTION OF ILLUSTRATIVE EMBODIMENTS

Aspects of the disclosure will now be described in detail with reference to the drawings, wherein like reference numbers refer to like elements throughout, unless specified otherwise. Certain terminology is used in the following description for convenience only and is not limiting. The term "plurality", as used herein, means more than one. The terms "a portion" and "at least a portion" of a structure include some of the structure up to the entirety of the structure.

The terms "substantially parallel" and "parallel" as used herein in reference to two elements with respect to each other includes the two elements being close to, but not exactly, parallel to each other and the two elements being exactly parallel to each other. The terms "substantially perpendicular" and "perpendicular" as used herein in reference to two elements with respect to each other includes the two elements being close to, but not exactly perpendicular to each other, and the two elements being exactly perpendicular to each other. The term "fixedly attached" as used herein in reference to a first element and a second element means the first element and the second element cannot be separated from each other without plastically deforming the first element, the second element, or both.

Certain features of the disclosure that are described herein in the context of separate embodiments may also be provided in combination in a single embodiment. Conversely, various features of the disclosure that are described in the context of a single embodiment may also be provided separately or in any subcombination. All methods described herein can be performed in any suitable order unless otherwise indicated herein or otherwise clearly contradicted by context.

Figure 1:
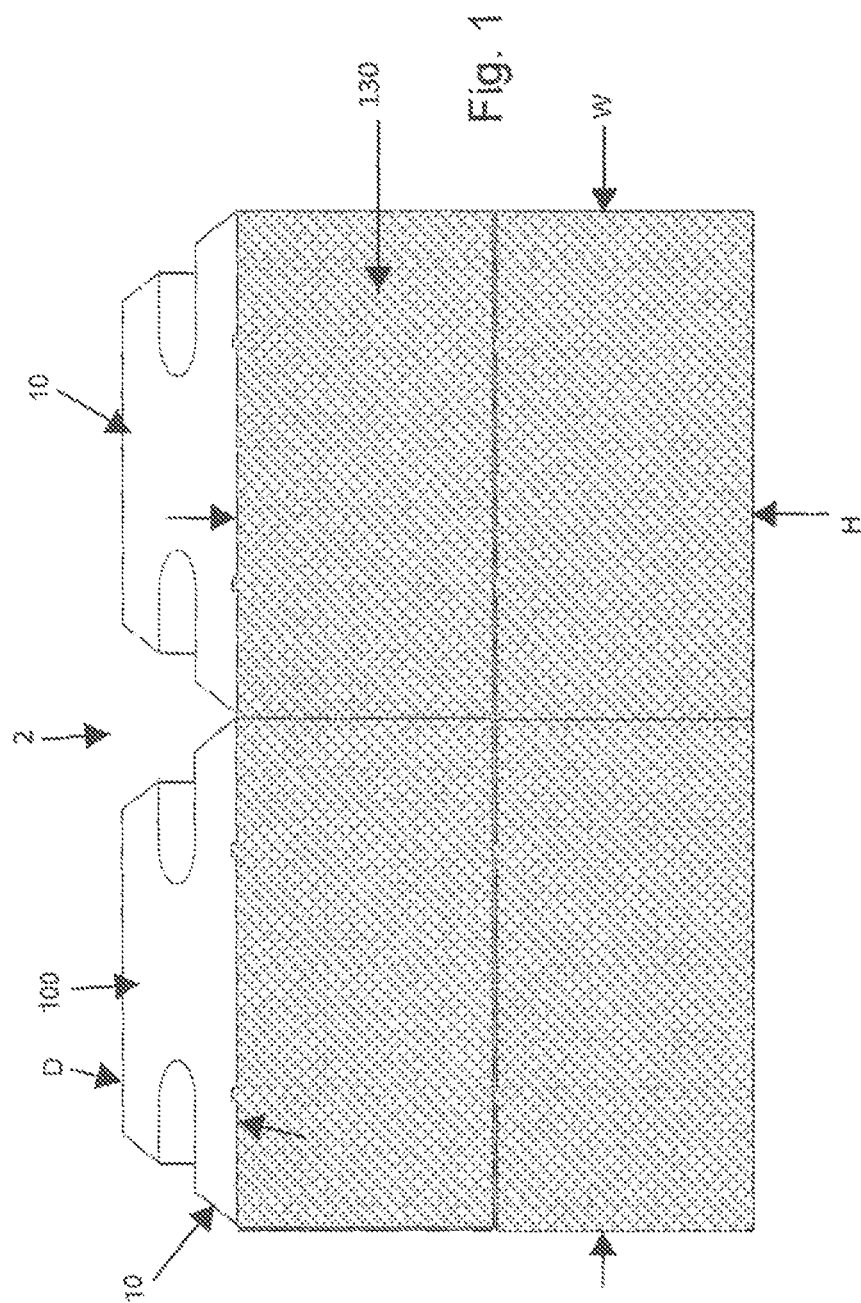
FIG. 1 is an isometric view of a plurality of hardscaping units arranged to form a wall, according to one embodiment of the disclosure.

Referring to FIG. 1, a plurality of hardscaping units 10 may be positioned adjacent to one another to form a wall 2. The wall may be constructed to have a different height H, width W1, depth D, and shape. For example, a wall may be as high, wide, or deep as a single hardscaping unit. Alternatively, a wall may be made up of layers of hardscaping units stacked one on top of another or placed adjacent to one another. A wall may be uniform throughout or may have a different height, width, depth, or shape throughout. A wall may have a straight shape, or it may be constructed to have a curved shape. The number of hardscaping units depicted in FIG. 1 is not limiting. The wall 2 may be configured such that a separate wall can be affixed or positioned adjacently to at least part of the first wall.

Figure 2:
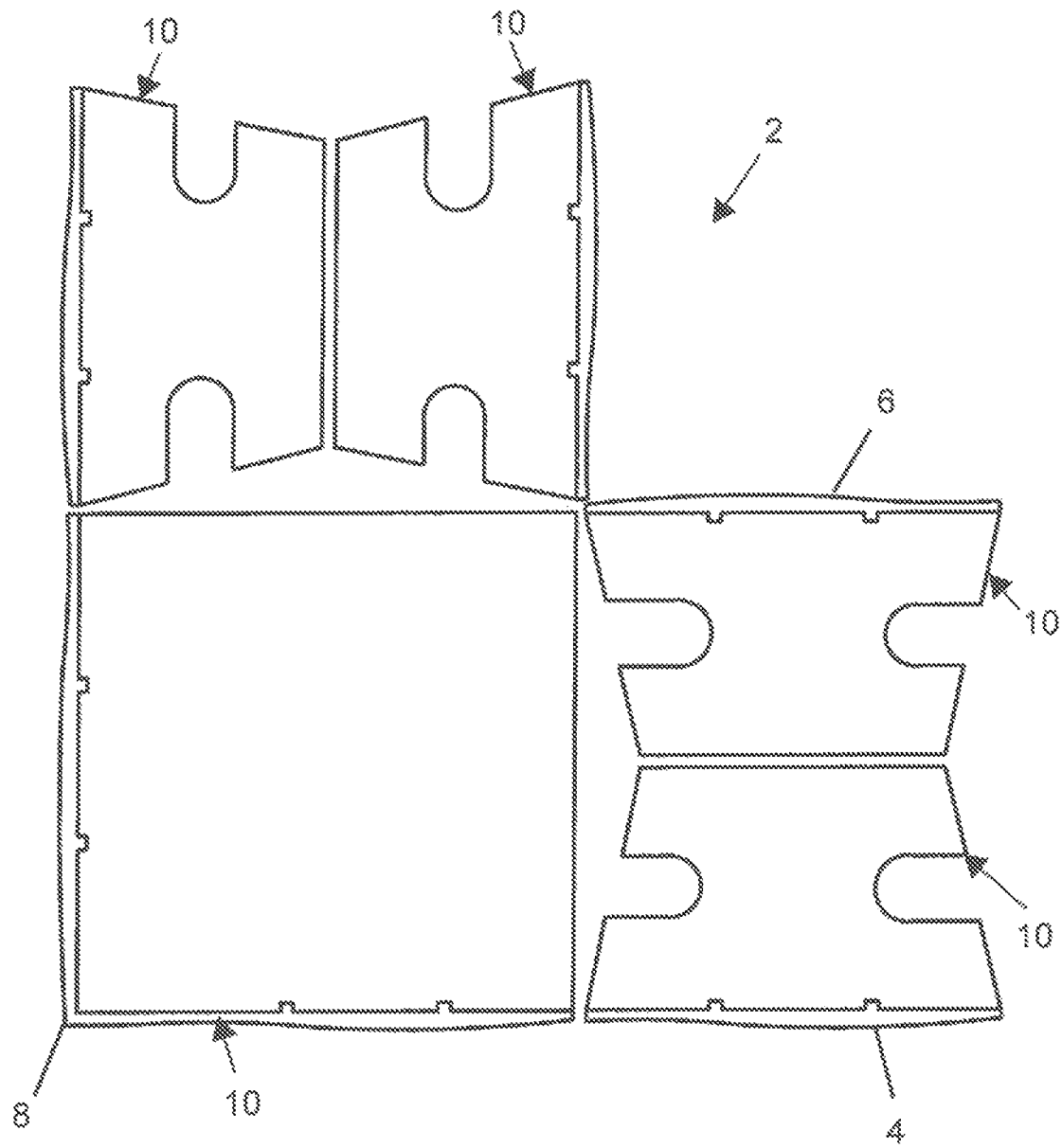
FIG. 2 is a top plan view of a plurality of hardscaping units arranged to form a wall according to another embodiment of the disclosure.

Referring to FIG. 2, the plurality of hardscaping units 10 may include hardscaping units 10 of different shapes arranged to form the wall 2 with various characteristics. As shown in the illustrated embodiment, the wall 2 includes a first side 4 and a second side 6 that each have an outward facing surface. Each of the first side 4 and the second side 6 may be straight, bent, curved, or any combination thereof.

For example, the wall 2 may include a corner 8 as shown in the illustrated embodiment. The plurality of hardscaping units 10 may be configured and arranged such that the first side 4 and the second side 6 each have an appearance similar to that of natural stone.

Figure 3:
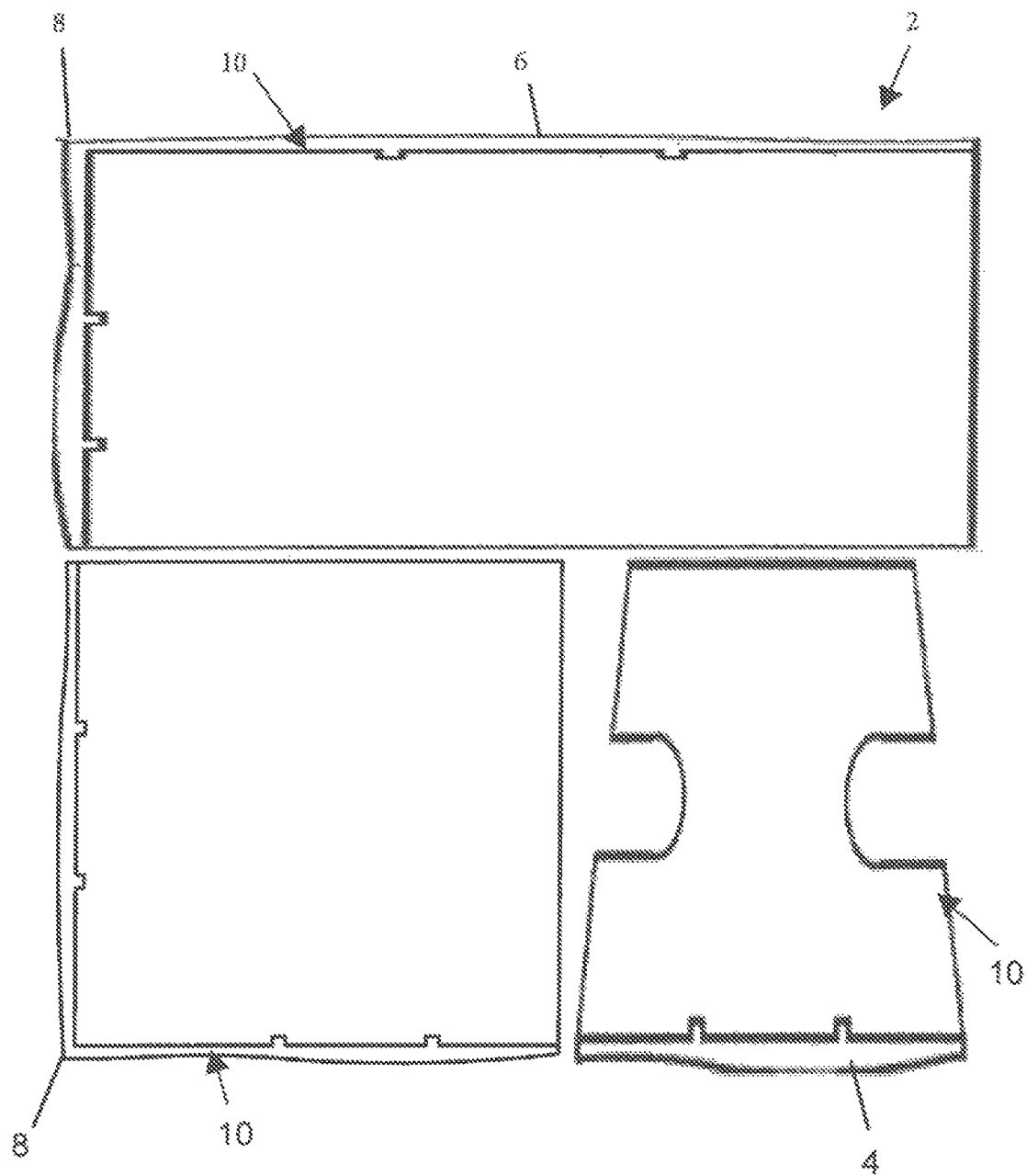
FIG. 3 is a top plan view of a plurality of hardscaping units arranged to form a wall according to another embodiment of the disclosure.

As shown in the illustrated embodiment of FIG. 3, the wall 2 includes a first side 4 and a second side 6 that each have an outward facing surface. The wall may include a plurality of corners 8 as shown in FIG. 3. The hardscaping units 10 may include hardscaping units 10 of different shapes and sizes.

Referring to FIG. 4, a hardscaping unit 10 may include a first block 100 (also referred to herein as a "backer block") and a second block 130 (also referred to herein as a "veneer block") secured to the first block 100. The first block 100 is configured to be easy to stack to facilitate efficient building of the wall 2. As shown in the illustrated embodiment, the first block 100 may include one or more substantially flat surfaces that are configured to abut other flat surfaces of other first blocks 100, thereby facilitating efficient building of the wall 2.

The second block 130 is configured to have an appearance that resembles natural (non-manufactured) stone. Thus the hardscaping unit 10 is configured to be quickly and easily stacked to build a wall while also presenting a natural stone appearance. The hardscaping unit 10 may be constructed to a variety of sizes and shapes. For example the hardscaping unit 10 may be in the shape of a trapezoidal prism. The hardscaping unit 10 may also be formed as a rectangular prism, triangular prism, or a variety of other suitable shapes (including non-prism shapes). As shown in the illustrative embodiment the hardscaping unit 10 may include one second block 130 fixedly attached to one first block 100. Alternatively, the hardscaping unit 10 may include a one or more of the second blocks 130 each attached to one or more of the first blocks 100.

Referring to FIGS. 5 to 8, the first block 100 may be constructed to have one of a variety of shapes and dimensions. For example, the first block 100 may be prismatic or pyramidal in shape, including, but not limited to, triangular, rectangular, other geometric and non-geometric shapes. The first block 100 includes a front surface 102, a back surface 106, a top surface 104, a bottom surface 108, a first side surface 110, and a second side surface 112. As shown in the illustrated embodiment, the front surface 102 may be spaced from, for example opposite to, the back surface 106 along a first direction D1. Also as shown in the illustrated embodiment, the top surface 104 may be spaced from, for example opposite to, the bottom surface 108 along a second direction D2. The first direction D1 may be substantially perpendicular to the second direction D2, as shown in the illustrated embodiment.

The top surface 104 and the bottom surface 108 may each be substantially planar such that the top surface 104 lies substantially in a first plane and the bottom surface 108 lies substantially in a second plane. According to one embodiment, the first plane and the second plane are substantially parallel to each other. According to another embodiment, the first plane and the second plane may be non-parallel to each other. The front surface 102 and the back surface 106 may each be substantially planar such that the front surface 102 lies substantially in a third plane and the back surface 106 lies substantially in a fourth plane. According to one embodiment the third plane and the fourth plane are substantially parallel to each other. As shown in the illustrated embodiment, the first and second planes may each be substantially perpendicular to the third and fourth planes.

According to another embodiment, the third plane and the fourth plane are non-parallel to each other.

The first side surface 110 and the second side surface 112 may each be substantially planar such that the first side surface 110 lies substantially in a fifth plane and the second side surface 112 lies substantially in a sixth plane. According to one embodiment, the fifth plane and the sixth plane are non-parallel to each other such that the first side surface 110 and the second side surface 112 converge along a direction from the front surface 102 to the back surface 106. As shown in the illustrated embodiment, the first block 100 includes a first length L1 defined by the front surface 102 and measured in a third direction D3 that is perpendicular to both the first direction D1 and the second direction D2, and the first block 100 includes a second length L2 defined by the back surface 106 and measured in the third direction D3.

The converging first and second side surfaces 110, 112 may result in the first block 100 having a first length L1 that is greater than the second length L2. The first length L1 being longer than the second length L2 may provide an advantage of the first block 100 configured to increase the area of the front surface 102 while minimizing the material used in and weight of the first block 100. As shown in the illustrated embodiment, the first block 100 defines a trapezoidal shape when viewed from above, or in the first plane.

The first block 100 has a width W1 measured from the back surface 106 to the front surface 102 in the first direction D1. The first block 100 further has a height H measured from the bottom surface 108 to the top surface 104 in the second direction D2. According to one embodiment, the first block 100 has a first length L1 of between about 12 inches and about 20 inches, a second length L2 of between about 10 inches and about 16 inches, a width W1 of between about 2 inches and about 8 inches, a height H of between about 3 inches and about 9 inches, or any combination thereof. According to one embodiment the first block 100 may have a first length L1 of about 16 inches, a second length L2 of about 13 inches, a width W1 of about 5 inches, and a height H of about 6 inches.

According to one embodiment, the first block 100 has a first length L1 of between about 7 inches and about 13 inches, a second length L2 of between about 4 inches and about 10 inches, a width W1 of between about 2 inches and about 8 inches, a height H of between about 3 inches and about 9 inches, or any combination thereof. According to one embodiment the first block 100 may have a first length L1 of about 10 inches, a second length L2 of about 7 inches, a width W1 of about 5 inches, and a height H of about 6 inches.

According to one embodiment, the first block 100 has a first length L1 of between about 3 inches and about 9 inches, a second length L2 of between about 1 inch and about 5 inches, a width W1 of between about 2 inches and about 8 inches, a height H of between about 3 inches and about 9 inches, or any combination thereof. According to one embodiment the first block 100 may have a first length L1 of about 6 inches, a second length L2 of about 3 inches, a width W1 of about 5 inches, and a height H of about 6 inches.

According to one aspect of the disclosure, a kit includes a plurality of hardscaping units 10, the plurality of hardscaping units 10 including a first hardscaping unit, a second hardscaping unit, and a third hardscaping unit. The first hardscaping unit may include a first block 100 having a first length L1 of between about 12 inches and about 20 inches, the second hardscaping unit may include a first block 100 having a first length L1 of between about 7 inches and about 13 inches, and the third hardscaping unit may include a first block 100 having a first length L1 of between about 3 inches and about 9 inches. According to one embodiment, the first blocks 100 of each of the first, second, and third hardscaping units may have equal widths W, equal heights H, or both.

The first block 100 may include a recess 116. The recess 116 may extend through both the top surface 104 and the bottom surface 108 such that the recess 116 extends through an entirety of the height H of the first block 100. Alternatively, the recess 116 may extend only through a portion of the height H of the first block 100. The recess 116 may be configured as a handhold for the first block 100, as a gap sized to reduce the amount of material needed to make the first block 100, or both. The first block 100 may include a plurality of recesses 116. Multiple ones of the plurality of recesses 116 may be defined by the same surfaces of the first block 100.

As shown in the illustrated embodiment, the first block 100 may include a first recess 116a defined by the first side surface 110, the top surface 104 and the bottom surface 108. The first block 100 may include a second recess 116b defined by the second side surface 112, the top surface 104 and the bottom surface 108. As shown in the illustrated embodiment, the first recess 116a and the second recess 116b may be substantially identical in size and shape. Alternatively, different ones of the recesses 116 may have different sizes, different shapes, or both.

The recess 116 may be formed in a variety of different shapes, such as, but not limited to, elliptical, rectangular, triangular, dovetail, geometric, and non-geometric. In further aspects, the recess 116 may be configured to receive a material, such as, but not limited to, cement, soil, sand, mulch, planting material, or a combination of the above, or other suitable material used in the field of landscaping or hardscaping.

According to one embodiment, the first block 100 may include a notch 114. The notch 114 may be positioned on one or more surfaces of the first block 100. As shown in the illustrated embodiment, the first block 100 may include one or more of the notches 114 defined at least partially by the front surface 102. The notch 114 may further be defined by additional surfaces of the first block 100. For example, the notch 114 may be further defined by the top surface 104, the bottom surface 108, or both. Thus the notch 114 may extend through a portion of the height H of the first block 100, up to an entirety of the height H of the first block 100.

The notch 114 may define one of a variety of shapes and dimensions. The notch 114 may have a cross-section shape, as viewed in the second direction D2, that is elliptical, triangular, rectangular, trapezoidal, or other geometric and non-geometric shapes. According to one embodiment, the notch 114 extends into the front surface 102 in a direction opposite the first direction D1 and terminates at a base surface 114a. The notch 114 may define a cross-sectional shape wherein an opening of the notch 114 in the front surface 102 defines a length measured in the third direction D3 that is equal to or greater than a length of the base surface 114a measured in the third direction D3, as shown in the illustrated embodiment. Alternatively, the notch 114 may define a cross-sectional shape wherein the length of the opening of the notch 114 in the front surface 102 defines is less than the length of the base surface 114a measured in the third direction D3.

The notch 114 may be constructed to have various widths, lengths, and depths. The notch 114 may include side walls 114b. The side walls 114b may be straight and parallel as shown in the illustrated embodiment. Alternatively, the side walls 114b may be not straight, non-parallel, or both. The side walls 114b may be perpendicular to the base surface 114a. The first block 114 may include a first notch and a second notch. The first and second notches may be identical, or they may differ in at least one of size and cross-sectional shape. The first block 100 may be devoid of notches 114. Alternatively, the first block 100 may include one, two, three, four, or five notches defined at least partially by the front surface 102. More specifically, the first block 100 may include 2 or 3 notches defined at least partially by the front surface 102.

The notches 114 may be evenly spaced such that the each of the notches 114 defined at least partially by the front surface 102 is equidistant from adjacent ones of the notches 114 defined at least partially by the front surface 102. A first one of the notches 114 may be spaced a length from one end of the front surface 102 that is equal to a length a second one of the notches 114 is spaced from another end of the front surface 102. According to one embodiment, the first length L1 of the first block 100 may be about 16 inches, a first one of the notches 114 may be spaced from an intersection of the front surface 102 and the first side surface 110 by about 3 inches, and a second one of the notches 114 may be spaced from an intersection of the front surface 102 and the second side surface 112 by about 3 inches. The first block 100 may further include a third one of the notches 114 that is spaced about 5 inches from the first one of the notches 114 and spaced about 5 inches from the second one of the notches 114.

According to another embodiment, the first length L1 of the first block 100 may be about 10 inches, a first one of the notches 114 may be spaced from an intersection of the front surface 102 and the first side surface 110 by about 2.5 inches, and a second one of the notches 114 may be spaced from an intersection of the front surface 102 and the second side surface 112 by about 2.5 inches. According to another embodiment, the first length L1 of the first block 100 may be about 6 inches, a first one of the notches 114 may be spaced from an intersection of the front surface 102 and the first side surface 110 by about 2 inches, and a second one of the notches 114 may be spaced from an intersection of the front surface 102 and the second side surface 112 by about 2 inches.

The notch 114 has a width W2 measured from the front surface 102 to the base surface 114a in the first direction D1. The notch 114 further has a length L3 measured from an intersection of the front surface 102 and one of the side walls 114b to an intersection of the front surface and the other of the side walls 114b in the third direction D3. According to one embodiment, the width W2 of the notch is between about 0.15 inches and about 0.35 inches, for example about 0.25 inches, the length L3 of the notch 114 is between about 0.25 inches and about 0.5 inches, for example about 0.375 inches, or both.

The first block 100 is formed from a first material that may include concrete, for example dry cast concrete. According to one embodiment the first material may include water and cement, and a water to cement ratio of between about 0.30 to about 0.36. The first material may have zero slump.

The first block 100 is formed by placing the first material into a first mold. The first mold is configured to shape the first material into the desired shape of the first block 100. When the first material takes the desired shape, the first material, having formed the first block 100, is removed from the first mold. The first block 100 may be cured to affect properties of the first block 100. For example, the first block 100 may be heated for a duration of time to increase robustness.

Figure 11:
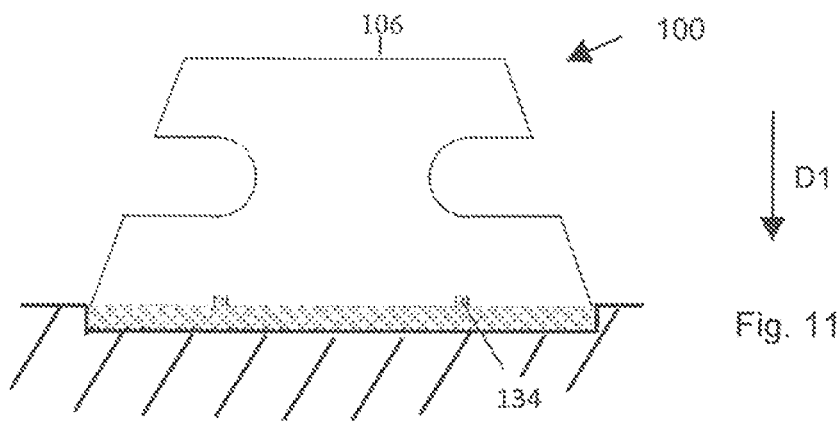
FIG. 11 is a cross-sectional view of the first block illustrated in FIG. 5, the first block in contact with the second block illustrated in FIG. 9, while the second block is positioned in the mold illustrated in FIG. 10.
Figure 9:
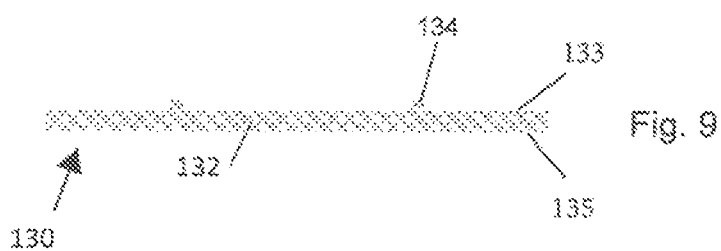
FIG. 9 is a top plan view of a second block of the hardscaping unit illustrated in FIG. 4.
Figure 10:
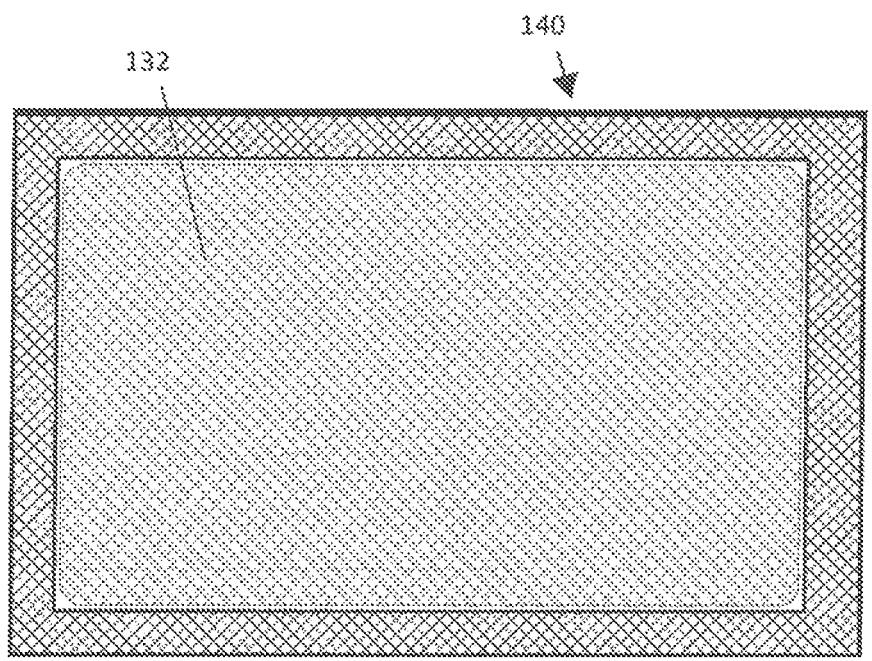
FIG. 10 is a top plan view of the second block of the hardscaping unit illustrated in FIG. 9, the second block positioned in a mold.

Referring to FIGS. 9 to 11, the hardscaping unit 10 also includes the second block 130. The second block may be formed from a second material 132. The second material 132 may include concrete, for example wet cast concrete. According to one embodiment the second material 132 may include water and cement, and a water to cement ratio of about 0.40 or higher. Thus, according to one embodiment, the second block 130 includes the second material 132 which has a greater water to cement ratio than that of the first material of the first block 100. Alternatively, the first material and the second material 132 may have water to cement ratios that are substantially equal. The second material 132 may be configured to change from a first constitution to a second constitution. In the first constitution the second material 132 is unsolidified, or in a more liquid state, and in the second constitution the second material 132 is solidified, or in a more solid state.

The second block 130 may have a face surface 135 and a contact surface 133. The contact surface 133 may be substantially planar and the face surface 135 may be opposite the contact surface 133. The face surface 135 of the second block 130 may include aesthetic features, such as, but not limited to, textures, designs, carvings, cutouts, or other features, for example features that mimic the appearance of natural stone. The face surface 135 may be constructed to resemble aspects appearing in nature, such as, but not limited to, stone, gravel, or planting material. In some aspects, the face surface may include features such as paint, clay, siding material, cement, plaster, or other building materials desirable in the field of landscaping or hardscaping.

The second block may include one or more protrusions 134. The protrusion 134 may define a shape that corresponds to the shape of the notch 114 of the first block 100. As shown the protrusion 134 may extend from the contact surface 133.

The second block 130 may be formed by placing the second material 132 into a second mold 140. The second mold 140 shapes the second material 132 into the desired shape of the second block 130. In one embodiment the second material 132 is removed from the second mold 140 after the second block 130 is shaped. The second block 130 may then be fixedly attached to the first block 100. In other aspects, the second material 132 is not removed from the second mold 140 until after the first block 100 is fixedly attached to the second material 132, which has formed the second block 130.

According to one embodiment, after the first block 100 is fixedly attached to the second block 130 the hardscaping unit 10 may be devoid of any portion of the first block 100 being nested between portions of the second block 130 with respect to the first direction D1, the hardscaping unit 10 may be devoid of any portion of the second block 130 being nested between portions of the first block 100 with respect to the first direction D1, or both. As shown in the illustrated embodiment of FIG. 11, the hardscaping unit 10 defines no line that can be drawn in the first direction D1 and that passes through one of the first block 100 and the second block 130, then passes through the other of the first block 100 and the second block 130, and then passes through the one of the first block 100 and the second block 130 again.

Figure 12:
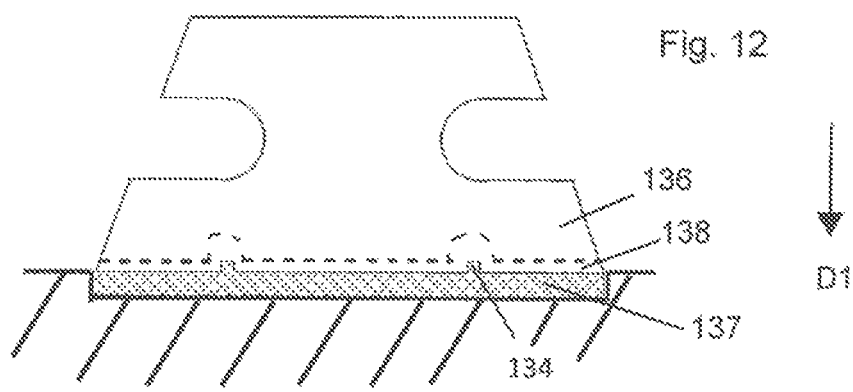
FIG. 12 is a cross-sectional view of the first block, the second block, and the mold illustrated in FIG. 11, the first block attached to the second block.

Referring to FIG. 12, after the first block 100 and the second block 130 are fixedly attached to one another to form the hardscaping unit 10, the hardscaping unit 10 may include a first portion, a second portion, and a third portion. The first portion 136 includes the first material, but does not include the second material 132. The second portion 137 includes the second material 132, but does not include the first material. The third portion 138 is positioned between the first portion 136 and the second portion 137 with respect to the first direction D1, and the third portion 138 includes both the first material and the second material 132.

Corner

Figure 13:
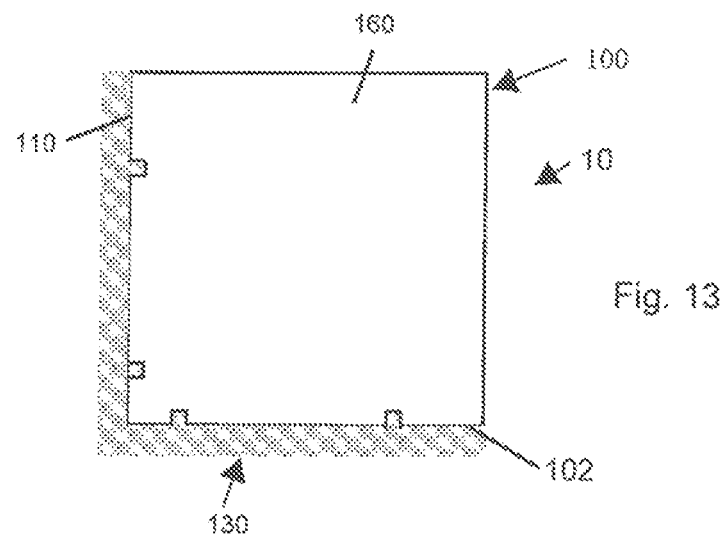
FIG. 13 is a top plan view of one of the plurality of hardscaping units illustrated in FIG. 2.

Referring to FIG. 13, the hardscaping unit 10 may be configured for use as a corner unit 160 in the wall 2. The first block 100 of the corner unit 160 may include two or more surfaces, for example the front surface 102 and the first side surface 110, in contact with the second block 130.

According to one aspect of the disclosure, the front surface 102 and the first side surface 110 may each simultaneously contact the second material 132 when the second material 132 is in the second mold 140. The first block 100 may be impacted, for example in a direction normal to the front surface 102, in a direction normal to the first side surface 110, or both. The second material 132 may be cured and then removed from the second mold 140. Alternatively, the front surface 102 and the first side surface 110 may each separately be contacted with the second material 132 while the second material 132 is in the second mold 140.

As shown in the illustrative embodiment the front surface 102 and the first side surface 110 are substantially perpendicular to each other and each contact the second block 130. Each of the front surface 102 and the first side surface 110 includes at least one of the notches 114 configured to engage with corresponding protrusions 134 of the second block 130. According to other embodiments, the first block 100 of the corner unit 160 may include more than two surfaces that contact the second block 130 of the corner unit 160. Although the front surface 102 and the first side surface 110 are perpendicular to each other in the illustrated embodiment, the surfaces of the first block 100 that contact the second block 130 may be at a non-perpendicular angle relative to one another.

Figure 14:
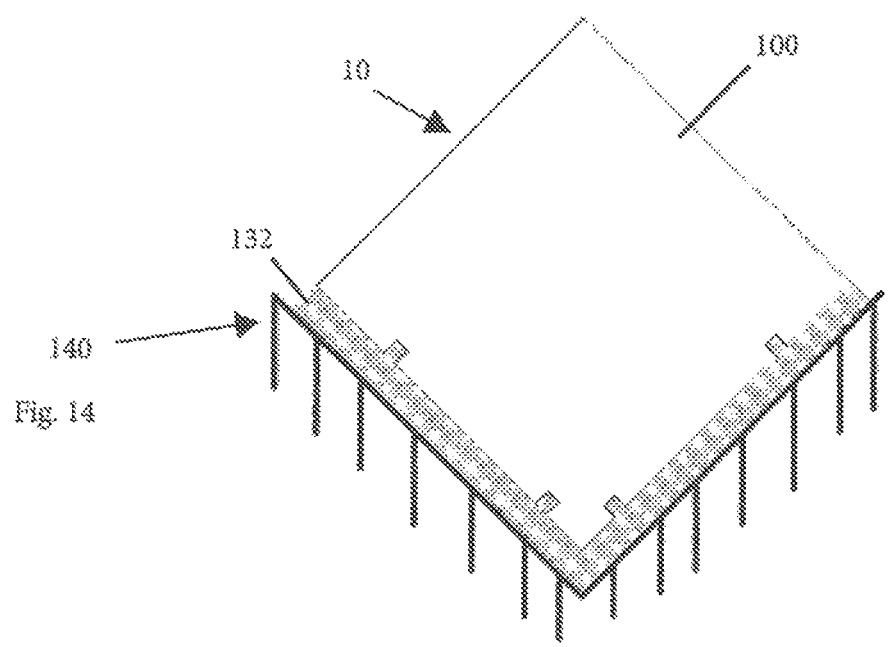
FIG. 14 is a cross-sectional view of the hardscaping unit illustrated in FIG. 13, the unit being positioned in a mold according to an embodiment of this disclosure.
Figure 15:
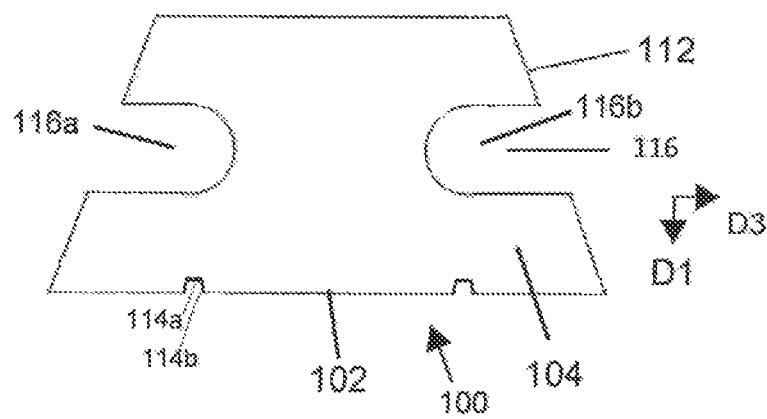
FIG. 15 is a top plan view of an alternative aspect of the first block illustrated in FIG. 5.

Referring to FIG. 14, the first block 100 of hardscaping unit 10 may contact the second material 132 while the second material 132 is in second mold 140. As shown in the illustrative embodiment of FIG. 14, the first block 100 may be positioned in the second mold 140 such that the front surface 102 and the first side surface 110 simultaneously contact the second material 132 within the second mold 140. In some embodiments, the first block 100 may be positioned on top of second material 132 such that the first block 100 is in contact with second material 132 at least partly due to the force of gravity. According to one aspect of the disclosure, a force, for example an impact force, may be applied to one or more surfaces of the first block 100 while the first block 100 is in contact with the second material 132. For example, a force may be applied to a surface of the first block 100 opposite the front surface 102, a surface of the first block 100 opposite the first side surface 110, or both.

Attachment

Referring to FIGS. 1 to 14, a method of assembling the hardscaping unit 10 may include fixedly attaching the first block 100 to the second block 130 using one or more the steps described herein. According to one embodiment, the first material is placed in the first mold, and the first material is then transitioned from a first state to a second state, the second state being more solid than the first state, and in the second state the first material forms the first block 100. The first block 100 is then removed from the first mold. The second material 132 is placed in the second mold 140. After removing the first block 100 from the first mold, at least one surface of the first block 100, for example the front surface 102, is contacted with the second material 132 while the second material 132 is in the second mold 140. Contact between the first block 100 and the second material 132 is maintained while transitioning the second material 132 from a third state to a fourth state, wherein the fourth state is more solid than the third state, and when in the fourth state the second material 132 forms the second block 130, which is fixedly attached to the first block 100. The fixedly attached second block 130 is removed from the second mold 140.

The first block 100 may be impacted with a force in one or more directions while the first block 100 is in contact with the second material 132, which is in the second mold 140. The one or more directions may include a direction substantially perpendicular to the surface of the first block 100 that contacts the second material 132.

Multiple surfaces of the first block 100 may contact the second material 132 simultaneously, for example the front surface 102 and the first side surface 110. The first block may be impacted in multiple directions. The first block 100 may be impacted in one direction that is substantially perpendicular to one of the contact surfaces, for example the front surface 102, and in another direction that is substantially perpendicular to another of the contact surfaces, for example the first side surface 110.

Impacting the first block 100 in one or more directions while at least one surface of the first block 100 contacts the second material 132 may force a portion of the second material 132 into the notches 114 of the contact surface of the first block 100 thereby resulting in a stronger attachment between the first block 100 and the second block 130. Impacting the first block 100 may drive the second material 132 into contact with the base surface 114a, one or more of the side walls 114b, or both the base surface 114a and one or more of the side walls 114b.

While the first block 100 is in contact with the second material 132, a portion of the second material 132 may penetrate the surface of the first block 100 that is in contact with the second material 132. The contact surface, for example the front surface 102 may include one or more cavities, such as, but not limited to, cracks, gaps, pores, orifices, and other openings or recesses that are configured to allow passage of a portion of the second material 132 through the contact surface and into the first block 100.

Movement of the portion of the second material 132 through the contact surface and into the first block 100 may be facilitated by the selection of the first and second materials. For example, use of a dry cast concrete for the first material and a wet cast concrete for the second material 132 may result in movement of the second material 132 into the first block 100. The lower moisture content of the first block 100 may draw in the higher moisture content material of the second material. The resulting hardscaping unit 10 assembled using a method involving one or more of the steps described herein may result in a hardscaping unit 10 that is less likely to break along the line of contact between the first block 100 and the second block 130, for example compared to a hardscaping unit that includes two blocks attached through other methods.

According to another embodiment, the first block 100 and the second block 130 may be fixedly attached by interlocking one or more structural features. For example, the structural features may include one or more of the protrusions 134 and one or more of the notches 114. Although the illustrated embodiment shows the protrusions 134 as part of the second block 130 and the notches 114 as part of the first block 100, alternative arrangements such as the first block including the protrusions 134, or both the notches 114 and the protrusions 134, and the second block including the notches 114, or both the notches 114 and the protrusions 134 are disclosed herein.

As shown in the illustrative embodiment, the second material 132 may form two protrusions 134 that engage with two notches 114 on the front surface 102 of the first block 100. The protrusions 134 may be rectangular prisms in shape that are configured to engage with corresponding notches 114 that are shaped as rectangular hollows. Such an engagement may help to fixedly attach the first block 100 to the second block 130 to form the hardscaping unit 10 and to maintain the fixed attachment during transportation, use, and/or further manufacturing of the hardscaping unit 10.

In addition to, or instead of any of the steps described above, an adhesive may be applied to one or both of the first block 100 and the second block 130 to fixedly attach the first block 100 and the second block 130. The adhesive may be applied to a contacting surface of the first block, for example the front surface 102, to a contacting surface of the second block, or to contacting surfaces of both the first block 100 and the second block 130. In some aspects, multiple adhesives may be applied to either or both of the first block 100 and the second block 130. Additional chemical bonding agents may be applied to one or more of the contacting surfaces. In some aspects, a bonding agent may alter the contact surface of the first block 100 or the contact surface of the second block 130 so as to improve the attachment of the first block 100 to the second block 130. A bonding agent may be applied to either or both of the first block 100 and the second block 130 to facilitate movement of the second material 132 from the second block 130 into the first block 100.

According to an embodiment of the disclosure, the first block 100 and the second block 130 are each formed and cured before they are brought into contact with one another. The first block 100 and the second block 130 are fixedly attached to one another after both the first material and the second material 132 are in a solid state. In some aspects, the second block 130 may be altered before being fixedly attached to the first block 100. For example, the second block 130 may have one or more of its surfaces smoothened to increase the surface area configured to contact the first block 100.

The first block 100 and the second block 130 may be fixedly attached to one another via a combination of the attachment methods described herein. In some aspects, multiple ones of the second block 130 may be attached to a single one of the first block 100 to form the hardscaping unit 10. Alternatively, multiple first blocks 100 may be attached to a single second block 130 to form the hardscaping unit 10.

In some aspects of the disclosure, a method of manufacturing the hardscaping unit 10 includes one or more of the steps described herein. The method of manufacturing may include the steps of manufacturing the first block 100, manufacturing the second block 130, and fixedly attaching the first block 100 to the second block 130. In another aspect, the method of manufacturing the hardscaping unit 10 may include steps of manufacturing the first block 100, contacting the first block 100 with at least a portion of the second material 132, and forming the second block 130 out of the second material 132 while the second material 132 is in contact with the first block 100.

Aspects of manufacturing the first block 100 may include placing a first material into a first mold. The first material is configured to enter and take the shape of the first mold. After the first material has taken the shape of the first mold, thus forming the first block 100, the first block 100 is removed from the first mold. The first block 100 may then be further cured to improve structural or chemical properties. The curing step may include drying the first block 100. The curing step may additionally, or alternatively, include heating the first block 100. In some aspects, the first block 100 may be further manufactured by treating one or more surfaces of the first block 100, smoothing one or more surfaces of the first block 100, applying a chemical substance, for example an adhesive, a bonding agent, a sealant, or another chemical substance, to one or more surfaces of the first block, fragmenting the first block 100 into smaller portions, or any combination thereof.

Aspects of manufacturing the second block 130 may include placing the second material 132 into the second mold 140. The second material 132 is configured to enter and take the shape of the second mold 140. After the second material 132 has taken the desired shape, thus forming the second block 130, the second block 130 may be removed from the second mold 140. The second block 130 may be further cured or manufactured by using any of or any combination of the steps described above in reference to the first block 100.

Advantages/Uses

The hardscaping unit 10 described herein may result in a stronger attachment between the first block 100 and the second block 130 compared to hardscaping units assembled using methods other than those described herein. According to one embodiment, the second block 130 may be less likely to become detached from the first block 100 without plastically deforming (or breaking) the hardscaping unit 10. In addition to improving durability of the hardscaping unit 10, a stronger attachment between the first block 100 and the second block 130 may result in more efficient packaging, transportation, and installation of the hardscaping units 10.

Hardscaping units assembled using methods other than those described herein may result in a finished product with a gap between first and second portions of the finished product. The hardscaping unit 10 assembled as described herein on the other hand may result in a relatively small gap or no gap between the first block 100 and the second block 130. The smaller gap, or the lack of a gap, lowers the chance of debris or water entering the gap between the first block 100 and the second block 130. Less debris between the first block 100 and the second block 130 may lower the chance of seeds or other organic material filling the gap, growing, and expanding, thus applying stresses on the contacting surfaces of the first block 100 and the second block 130, potentially leading to detachment or fracturing of one or more of the first block 100 and the second block 130. The reduction or elimination of a gap between the first block 100 and the second block 130 also reduces the chance of an edge of one of the hardscaping units 10 catching on an edge of the gap of another of the hardscaping units 10, thus increasing the efficiency with which the wall 2 can be built.

There also exist benefits of manufacturing the hardscaping unit 10 using the methods described herein. According to one embodiment the second material 132 is attached to the first block 100 while the second material 132 is in an unsolidified constitution. The second block is then formed while being in contact with the first block 100. This method of manufacturing the hardscaping unit 10 may requires less time to manufacture than using other methods of manufacture, such as forming the first block 100 and the second block 130 separately and then attaching the formed first block 100 and the formed second block 130 to each other once both are in a solidified state.

Additional manufacturing time may be saved because the hardscaping unit 10 manufactured according to the methods described herein allows for the option of curing the first block 100 and the second block 130 together, rather than curing each of the first block 100 and the second block 130 individually and then curing the fixedly attached first and second blocks 100, 130 again. Many, if not all, of the advantages listed herein may reduce costs associated with manufacturing hardscaping units.

It will be appreciated that the foregoing description provides examples of the disclosed hardscaping unit 10 and methods of manufacturing and assembling the hardscaping unit 10. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

Recitation of ranges of values herein are merely intended to serve as a shorthand method of referring individually to each separate value falling within the range including the stated ends of the range, unless otherwise indicated herein, and each separate value is incorporated into the specification as if it were individually recited herein.

Although the disclosure has been described in detail, it should be understood that various changes, substitutions, and alterations can be made herein without departing from the spirit and scope of the invention as defined by the appended claims. Moreover, the scope of the present disclosure is not intended to be limited to the particular embodiments described in the specification. As one of ordinary skill in the art will readily appreciate from the disclosure of the present invention, processes, machines, manufacture, composition of matter, means, methods, or steps, presently existing or later to be developed that perform substantially the same function or achieve substantially the same result as the corresponding embodiments described herein may be utilized according to the present disclosure.

What is claimed:

1. A corner hardscaping block having a simulated stone appearance on two angularly arranged exterior surfaces, comprising,
   a) a dry cast concrete backer block comprising: (i) a front contact surface; and (ii) a side contact surface angularly arranged relative to the front contact surface; each of the front and side contact surfaces having a height and a width;
   b) a wet cast concrete veneer block comprising: i) a pair of interiorly facing contact surfaces arranged angularly relative to each other and each defining a veneer block contact surface; and (ii) an exteriorly facing simulated stone surface opposed each veneer block contact surface; each veneer block contact surface being substantially coextensive in height and width with the front contact and side contact surfaces, respectively, the front contact surface, side contact surface and veneer block contact surfaces being bonded together to form an integrated hardscaping unit;
   c) the dry cast concrete backer block formed from a mix having a water to cement ratio of 0.3 to 0.36;
   d) wherein the bonding is the result of the wet cast concrete having a water to cement ratio of at least 0.4 being brought into contact with the front and side contact surfaces while the wet cast concrete is in a liquid phase and the dry cast concrete is in a solid phase in a mold that also forms the exteriorly facing simulated stone surface and that has first and second mold sides converging to form a corner arranged relative to a ground surface such that the mold sides are disposed at an oblique angle relative to the ground surface and the corner is closer to the ground surface than the mold sides.

2. The corner hardscaping block according to claim 1 wherein the contact surfaces of the backer block are substantially perpendicular to each other and the contact surfaces of the veneer block are substantially perpendicular to each other.

3. The corner hardscaping block according to claim 1 wherein the front and side contact surfaces comprise notches disposed therein and the wet cast concrete is disposed in, and adhered to surfaces of, the notches.

4. The corner hardscaping block according to claim 3 wherein the notches comprise side surfaces that diverge away from each other in a direction relative to a base surface.

5. The corner hardscaping block according to claim 1 wherein the front and side contact surfaces were brought into contact with the wet cast concrete while in the mold by application of gravitational force that urges the backer block in a direction toward the wet cast concrete.

6. The corner hardscaping block according to claim 1 further comprising a bonding agent applied between the dry cast front and side contact surfaces and the veneer block contact surfaces.

7. The corner hardscaping block according to claim 1 further comprising substantially flat opposing top and bottom surfaces adapted to allow vertical stacking of a plurality of blocks.

8. The corner hardscaping block according to claim 1 wherein the dry cast concrete and wet cast concrete are cured by application of heat.

9. A hardscaping unit comprising a dry cast concrete backer block having two angularly arranged contact surfaces, defining backer block contact surfaces, bonded to adjacent contact surfaces of a wet cast concrete veneer block, defining veneer block contact surfaces, the backer block formed from a mix having a water to cement ratio of 0.3 to 0.36, the veneer block formed from a mix having a water to cement ratio of at least 0.4, the bonding being the result of wet cast concrete being brought into contact with the backer block contact surfaces while the wet cast concrete is in a liquid phase and the dry cast concrete is in a solid phase in a mold that also forms an exteriorly facing simulated stone surface of the veneer block and that has first and second mold sides converging to form a corner arranged relative to a ground surface such that the mold sides are disposed at an oblique angle relative to the ground surface and the corner is closer to the ground surface than the mold sides.

10. The hardscaping unit according to claim 9 wherein the exterior facing simulated stone surfaces are substantially perpendicular and the hardscaping unit defines a corner block.

11. The hardscaping unit according to claim 9 wherein the backer block contact surfaces comprise notches disposed therein and the wet cast concrete is disposed in, and adhered to surfaces of, the notches.

12. The hardscaping unit according to claim 9 further comprising a bonding agent applied between the backer block contact and veneer block contact surfaces.

13. The hardscaping unit according to claim 9 wherein the backer block contact surfaces were brought into contact with the wet cast concrete while in the mold by application of gravitational force that urged the backer block in a direction toward the wet cast concrete.

14. The hardscaping unit according to claim 9 further comprising substantially flat opposing top and bottom surfaces adapted to allow vertical stacking of a plurality thereof.

\* \* \* \* \*